UNITED STATES PATENT OFFICE.

HENRY R. RANDALL, OF BROOKLYN, NEW YORK.

PROCESS OF SEPARATING THE FIBER OF COCOONS.

SPECIFICATION forming part of Letters Patent No. 335,958, dated February 9, 1886.

Application filed October 12, 1885. Serial No. 179,905. (No specimens.)

*To all whom it may concern:*

Be it known that I, HENRY R. RANDALL, of Brooklyn, in the county of Kings and State of New York, have invented certain Improvements in Separating the Fibers of Cocoons, of which the following is a specification.

This invention relates more particularly to what are known as "pierced" cocoons, these being cocoons from which the silk-bearing worm has made its escape, and in so doing cut through the fibers, thereby preventing their separation by reeling in the manner practiced with unpierced cocoons. As heretofore treated for the separation of their fibers, the pierced cocoons are placed in a solution of soap and water and permitted to ferment during a period of usually about two weeks, the fermentation destroying the gummy substance by a rotting process, and thereby permitting the fibers to separate. This method is very offensive from the foul odors produced, is objectionable from sanitary considerations, constitutes a nuisance when practiced in the vicinity of dwellings, as in cities or populous neighborhoods, and is uncertain in its results, as the progress of fermentation varies with the temperature, the weather, and other conditions under which it is carried on, and requires very great skill in its practice, for the reason that if the fermentation cease below a certain point the separation of the fibers is imperfect, while, on the other hand, a slight excess of fermentation injures and any considerable excess destroys the fiber, and, furthermore, it is found in practice that an appreciable proportion of the fiber is lost during the treatment aforesaid and in the operations incidental to such treatment.

Although my invention is more particularly designed for the treatment of pierced cocoons, it may, when desired, be applied in the treatment of unpierced cocoons, such as are usually separated by reeling, as above mentioned.

In the practice of my said invention I provide a solution of hydrochloric acid in water in the preferred proportions of about one ounce of the acid to the gallon of water. This solution I place in a tank, vessel, or receptacle, and by any suitable means maintain the liquid at a temperature which must not reach the boiling-point of water—viz., 212° Fahrenheit—and which affords the best results at a temperature of about 150° Fahrenheit. Preferably the tank, vessel, or receptacle should be closed during the treatment of the cocoons. I place the cocoons in the acid liquid, heated as hereinbefore set forth, and steep them therein until the gum is disintegrated, and to some extent dissolved, by the acid solution, which ordinarily occupies from seven to eight hours. When the gum is sufficiently disintegrated, softened, and dissolved to permit the ready separation of the fibers, they are removed from the acid solution and washed in water, which should be below the boiling-point, but preferably somewhat above 150° Fahrenheit. When the gummy residuum and the traces of acid are substantially removed by the washing with water, as aforesaid, the cocoons are dried, and the fibers are then straightened or mechanically separated by any of the usual or any suitable means, and thus brought to condition for spinning.

By means of my said invention the gummy or cementing substance which unites the fibers in the cocoon is reduced, disintegrated, or destroyed much more effectually than by the usual or fermenting process, and their mechanical separation is proportionally less difficult and more complete, and the time required instead of being two weeks, as in the old process, is brought down to a few hours.

What I claim as my invention is—

The process herein described of preparing cocoons for the mechanical separation of their fibers, consisting in subjecting the cocoons to the action of a solution of hydrochloric acid at a temperature of or approximating 150° Fahrenheit, substantially as specified.

HENRY R. RANDALL.

Witnesses:
JOHN G. HONEY,
CHARLES MACINNES.